UNITED STATES PATENT OFFICE.

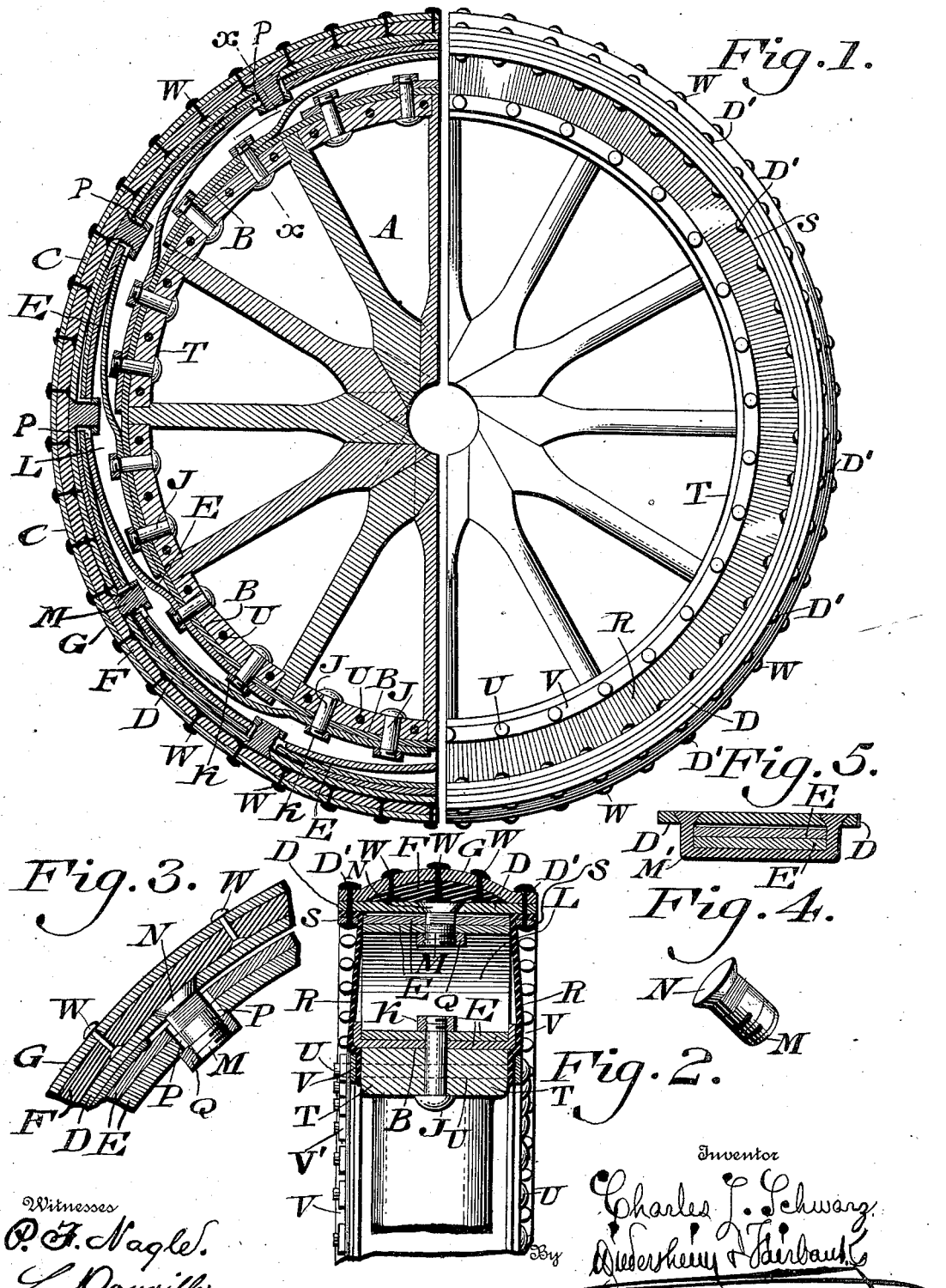

CHARLES L. SCHWARZ, OF PHILADELPHIA, PENNSYLVANIA.

TIRE.

997,708.

Specification of Letters Patent.   Patented July 11, 1911.

Application filed May 16, 1906. Serial No. 317,080.

*To all whom it may concern:*

Be it known that I, CHARLES L. SCHWARZ, a citizen of the United States, residing in the city and county of Philadelphia, State of Pennsylvania, have invented a new and useful Tire, of which the following is a specification.

My invention consists of a tire embodying a resilient rim, the construction of which and the manner of connecting the same with the felly of a wheel, will be hereinafter set forth.

Figure 1 represents a partial side elevation and partial section of a tire embodying my invention. Fig. 2 represents an irregular section of a portion on an enlarged scale, on line $x$—$x$ Fig. 1. Fig. 3 represents a portion of the section shown in Fig. 1 on an enlarged scale. Fig. 4 represents a perspective view of one of the bolts employed. Fig. 5 represents a transverse section of a modified form of a portion.

Similar letters of reference indicate corresponding parts in the figures.

Referring to the drawings: A designates a wheel and B designates the felly band thereof. C designates a resilient tread rim which encircles said band composed of the outer band D, the springs E, the cushion F, the circumferential covering G and the side covering R.

The springs E are connected at one end with the felly band B by the bolts J and nuts K and then extend from said felly band about the wheel in the space or chamber L between said felly band B and the rim C their other ends being connected with the outer band D by means of the bolts M which are headed on said outer band D as at N and thus tightly secured thereto, while their shanks enter the elongated slots P in the last-named ends of the springs E whereby the latter are permitted to play on said shanks. The inner ends of the bolts are threaded and receive the nuts Q which bear against the springs E, thus firmly retaining the bolts in position and securing the springs to the outer band D. It will now be noticed that the springs E are interposed between the bands B, D, and impart resiliency to the tread rim C which advantageous feature is imparted to the wheel, rendering it easy in riding and preventing shocks and blows from reaching the wheel at least to any material extent. Furthermore, the springs E extend from the felly band B at intervals and are so spaced apart that at any given point between the felly band B and the tread rim C, there is a cluster of three springs which thus serve to support and firmly sustain the tread rim C on the wheel proper, especially when loaded. The cushion F is placed on the outer band D and held in place by the cover G of pliable material whose sides are secured to the end portions of the outer band D by the rivets D' which are passed through said parts and properly headed thereon.

In order to close the sides of the space or chamber L, I employ the skirts R of pliable material, the same being each secured at one end to the outer band D by the rivet D' and bands S, the latter acting as washers. The other end of each skirt is connected with the felly T of the wheel by means of the bolts U which pass through bands V as washers, the skirt and the felly and have nuts V' on their threaded ends for tightening purposes. By this provision while the chamber L is closed or covered, preventing the entrance of dirt and foreign matters, the springs are also concealed and improper access to the same prevented. Furthermore, the outer band D extends outwardly beyond the sides of the springs and so serves as a guard for the latter preventing the same from being struck by or striking objects as the wheel is running.

In order to add to the stability of the cover G, the same is studded with rivets W which pass through cushion and cover and are secured thereto, thus forming reinforces as well as causing the tread of the wheel to take firm hold of the ground or roadway and prevent slipping of the wheel.

In lieu of the bolts M, I may employ the clips M' for securing the springs to the tread rim C, said clips being attached to the outer band D and freely embracing the relative portions of said springs.

Having thus described my invention, what I claim as new and desire to secure by Letters Patent, is:

1. In a tire, a rim composed of a felly band, an outer band, a cushion thereon, a pliable tread secured to said cushion, a plurality of springs between said bands, each of which is secured directly to said felly band at one end and the other end connected with the outer band, said springs extending circumferentially with their outer ends overlapped and movable on each other, and bolts passed through the overlapped portions of said springs, which latter have elongated slots, the outer ends of said springs being covered by the outer band and the outer ends of the bolts covered by and bearing against said cushion.

2. In a tire, a resilient rim comprising an outer band, a felly band, spacing means therefor, a cushion on the outer band, a cover for said cushion, reinforces for said covering passed through the cushion and beyond the covering for contact with the ground, a covering for the space between the outer band and the felly band, and rivets passed through said covering and outer band and the covering for the cushion.

3. A resilient rim comprising a cushion, an outer band on which said cushion rests, a cover for said cushion exterior thereof, a felly band, springs between said felly band and outer band, side coverings for the space between the outer band and the felly band, means extending beyond the outer band for reinforcing the surface of said rim and increasing its frictional action on a roadway, and bands parallel with the outer band and between which and the outer band of the rim said side coverings are retained.

CHARLES L. SCHWARZ.

Witnesses:
JOHN A. WIEDERSHEIM,
S. R. CARR.

Copies of this patent may be obtained for five cents each, by addressing the "Commissioner of Patents, Washington, D. C."